United States Patent
Zeghlache et al.

(10) Patent No.: US 11,859,486 B2
(45) Date of Patent: Jan. 2, 2024

(54) SYSTEM AND METHOD USING SENSORS EMBEDDED ON TAPE FOR CORROSION MONITORING

(71) Applicant: Saudi Arabian Oil Company, Dhahran (SA)

(72) Inventors: Mohamed Larbi Zeghlache, Al Khubar (SA); Wael O. Badeghaish, Al Khubar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 199 days.

(21) Appl. No.: 17/453,173

(22) Filed: Nov. 1, 2021

(65) Prior Publication Data

US 2023/0135104 A1 May 4, 2023

(51) Int. Cl.
*E21B 47/12* (2012.01)
*G01N 17/02* (2006.01)
*E21B 47/00* (2012.01)

(52) U.S. Cl.
CPC ............ *E21B 47/006* (2020.05); *E21B 47/12* (2013.01); *G01N 17/02* (2013.01)

(58) Field of Classification Search
CPC ........ E21B 47/006; E21B 47/12; G01N 17/02
See application file for complete search history.

(56) References Cited

U.S. PATENT DOCUMENTS

| | | | |
|---|---|---|---|
| 6,158,276 A * | 12/2000 | Patey | E21B 17/0285 340/855.1 |
| 6,328,878 B1 | 12/2001 | Davis et al. | |
| 6,550,321 B1 * | 4/2003 | Patey | E21B 47/01 73/152.52 |
| 6,843,119 B2 * | 1/2005 | Patey | E21B 47/017 73/152.52 |

(Continued)

FOREIGN PATENT DOCUMENTS

| | | |
|---|---|---|
| GB | 2338307 A | 12/1999 |
| GB | 2501184 A | 10/2013 |

OTHER PUBLICATIONS

Wright, Ruishu, et al. Corrosion Sensors for Structural Health Monitoring of Oil and Natural Gas Infrastructure: A Review. Sensors. 2019; 19(18):3964. https://www.mdpi.com/1424-8220/19/18/3964.

(Continued)

*Primary Examiner* — Frederick L Lagman
(74) *Attorney, Agent, or Firm* — Leason Ellis LLP

(57) ABSTRACT

A system and method use a sensor embedded in flexible tape to monitor for corrosion of a structure, such as a conveyance line in a well. The system comprises the structure, a spool, a flexible tape, a sensor, a spool driver, and a processor. The structure includes a window adjacent to an element under test. The flexible tape is retained by the spool. The sensor is embedded in the tape, with the sensor being configured to detect a corrosion of the element and to generate corresponding sensor data. The spool driver is coupled to the (Continued)

spool and advances the tape from the spool to position the sensor adjacent to the window, thereby to position the sensor adjacent to the element to detect the corrosion. The processor is configured by code stored therein to receive the sensor data and to generate and output an alert of the detected corrosion.

20 Claims, 6 Drawing Sheets

(56) References Cited

U.S. PATENT DOCUMENTS

| | | | |
|---|---|---|---|
| 7,520,160 | B1 | 4/2009 | Toribio |
| 8,893,549 | B2 | 11/2014 | Daton-Lovett |
| 9,869,172 | B2 | 1/2018 | Donderici et al. |
| 10,450,840 | B2 | 10/2019 | Xu |
| 10,767,470 | B2 | 9/2020 | Fouda et al. |
| 2007/0193357 | A1 | 8/2007 | Daaland et al. |
| 2010/0224913 | A1 | 9/2010 | Chiang et al. |
| 2012/0245043 | A1 | 9/2012 | England |
| 2014/0069542 | A1* | 3/2014 | Graham ............ G01M 3/18 138/104 |
| 2014/0212983 | A1 | 7/2014 | DiFoggio |

OTHER PUBLICATIONS

Khan, Md Ashfaque Hossain, et al. Recent Advances in Electrochemical Sensors for Detecting Toxic Gases: $NO_2$, $SO_2$ and $H_2S$. Sensors (Basel). Feb. 21, 2019;19(4):https://pubmed.ncbi.nlm.nih.gov/30795591/.

Analatom Structual Health Monitoring Solutions; https://analatom.com/products-LPR.html; 2021.

Wang, Youhua, et al. "Low-cost, μm-thick, tape-free electronic tattoo sensors with minimized motion and sweat artifacts." npj Flex Electron 2, 6 (2018)., https://www.nature.com/articles/s41528-017-0019-4.pdf.

Piro, Benoît, et al. "Recent Advances in Skin Chemical Sensors." Sensors. 2019; 19(20):4376., https://www.mdpi.com/1424-8220/19/20/4376/htm.

Xu, Tianbai, et al. "High resolution skin-like sensor capable of sensing and visualizing various sensations and three dimensional shape." Scientific reports vol. 5 12997. Aug. 13, 2015,https://www.ncbi.nlm.nih.gov/pmc/articles/PMC4534778/#!po=0.892857.

Teifler, Omri et al. "Clinic-on-a-Needle Array toward Future Minimally Invasive Wearable Artificial Pancreas Applications." ACS nano, vol. 15,7 12019-12033. Jun. 22, 2021, doi: 10.1021/acsnano.1c03310.

Al-Janabi, Yahya T. "Monitoring of Downhole Corrosion: An Overview." Paper presented at the SPE Saudi Arabia Section Technical Symposium and Exhibition, Al-Khobar, Saudi Arabia, May 2013., https://www.onepetro.org/conference-paper/SPE-168065-MS.

Ullah, Nisar, et al. ""Nanomaterial-based optical chemical sensors for the detection of heavy metals in water: Recent advances and challenges."" TrAC Trends in Analytical Chemistry, vol. 100, 2018, pp. 155-166.

Qurashi, Ahsanulhaq, et al. ""Catalyst supported growth of In2O3 nanostructures and their hydrogen gas sensing properties."" Sensors and Actuators B: Chemical.

Qurashi, Ahsanulhaq, et al. "Hierarchical ZnO/zeolite nanostructures: synthesis, growth mechanism and hydrogen detection." RSC Advances, vol. 5, Issue 29, 2015, pp. 22570-22577, https://pubs.rsc.org/en/content/articlelanding/2015/ra/c4ra15497e/unauth#/!divRelatedContent&articles.

* cited by examiner

SYSTEM AND METHOD USING SENSORS EMBEDDED ON TAPE FOR CORROSION MONITORING

FIELD OF THE DISCLOSURE

The present disclosure relates generally to corrosion sensors, and, more particularly, to a system and method using sensors for corrosion monitoring.

BACKGROUND OF THE DISCLOSURE

Corrosion of wells, pipelines, and casings in the oil and gas industry can jeopardize the integrity of upstream and downstream assets. Different methods can be used to detect corrosion. Indirect measurements such as lab analysis and pressure tests are typically limited to evaluations at surface conditions, and so are not useful for sub-surface tests for corrosion of underground structures. Direct measurements such as by ultrasonic testing, electromagnetic flux testing, and probes are typically expensive to perform. In addition, such tests and probes are complex to deploy for accurate evaluations. Another type of test relies on the use of coupons, which insert an in-line intrusive corrosion monitoring device for direct contact with corrosive fluids and for monitoring long term performance of structures. However, the use of coupons can be expensive and typically have low resolution of detection of corrosion and corrosion rate.

SUMMARY OF THE DISCLOSURE

According to an embodiment consistent with the present disclosure, a system and method use a sensor embedded in a flexible tape which monitors for corrosion of a structure, such as a conveyance line in a well.

In an embodiment, a system comprises a structure, a spool, a flexible tape, a sensor, a spool driver, and a processor. The structure includes a window adjacent to an element under test. The flexible tape is retained by the spool. The sensor is embedded in the tape, with the sensor being configured to detect a corrosion of the element and to generate corresponding sensor data. The spool driver is coupled to the spool and is operative to advance the tape from the spool to position the sensor adjacent to the window, thereby to position the sensor adjacent to the element to detect the corrosion. The processor is configured by code stored therein to receive the sensor data and to generate and output an alert of the detected corrosion.

The sensor can be selected from the group consisting of, but not limited to: a chemical sensor, an organic sensor, and a polyethylene terephthalate (PET) sensor. The tape advances from the spool in a direction relative to the structure, with the direction being selected from the group consisting of: a horizontal direction, a vertical direction, a diagonal direction, an inline-longitudinal direction, an inline-azimuthal direction, a parallel-longitudinal direction, and a parallel-azimuthal direction. The processor includes a data acquisition unit configured to receive the sensor data, a data analysis unit configured to generate the alert from the sensor data, and a data communication unit configured to output the alert to an external system. The data analysis unit formats the alert to be in a predetermined communication format. The data analysis unit can also format the sensor data to be in a predetermined communication format, and the data communication unit can be configured to output the formatted sensor data to the external system. The external system is an output device configured to output the alert or the sensor data.

In another embodiment, a system comprises a conveyance line in a well, a spool, a flexible tape retained by the spool, a plurality of sensors, a spool driver, and a processor. The plurality of sensors are embedded in and distributed along the tape, wherein the plurality of sensors are configured to detect a corrosion of the conveyance line and to generate corresponding sensor data. The spool driver is coupled to the spool and is operative to advance the tape from the spool to position the plurality of sensors adjacent to the conveyance line. The processor is configured by code stored therein to receive the sensor data, and to generate and output an alert of the detected corrosion.

Each of the plurality of sensors can be selected from the group consisting of: a chemical sensor, an organic sensor, and a polyethylene terephthalate (PET) sensor. The tape advances from the spool in a direction relative to the conveyance line, with example of the direction being selected from the group consisting of: a horizontal direction, a vertical direction, a diagonal direction, an inline-longitudinal direction, an inline-azimuthal direction, a parallel-longitudinal direction, and a parallel-azimuthal direction. The processor includes a data acquisition unit configured to receive the sensor data, a data analysis unit configured to generate the alert from the sensor data, and a data communication unit configured to output the alert to an external system. The data analysis unit formats the alert to be in a predetermined communication format. The data analysis unit can also format the sensor data to be in a predetermined communication format, and the data communication unit is configured to output the formatted sensor data to the external system. The external system is an output device configured to output the alert or the sensor data.

In a further embodiment, a method comprises providing a structure including a window adjacent to an element under test, retaining a flexible tape having an embedded sensor with a spool, advancing the tape from the spool to position the sensor adjacent to the window, thereby to position the sensor adjacent to the element to detect the corrosion and to generate corresponding sensor data, receiving the sensor data at a processor, generating an alert of the detected corrosion, and outputting the alert to an external system.

The sensor can be selected from the group consisting of, but not limited to: a chemical sensor, an organic sensor, and a polyethylene terephthalate (PET) sensor. The tape advances from the spool in a direction relative to the structure, with example of the direction being selected from the group consisting of: a horizontal direction, a vertical direction, a diagonal direction, an inline-longitudinal direction, an inline-azimuthal direction, a parallel-longitudinal direction, and a parallel-azimuthal direction. The method further comprises outputting the sensor data to the external system or to a memory. The processor includes a data acquisition unit configured to receive the sensor data, a data analysis unit configured to generate the alert from the sensor data, and a data communication unit configured to output the alert to the external system. The external system is an output device configured to output the alert or the sensor data.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system 10 and method 100 using a sensor embedded in a flexible tape which monitors for corrosion of a structure, such as a conveyance line in a well or pipeline.

Figure 1:
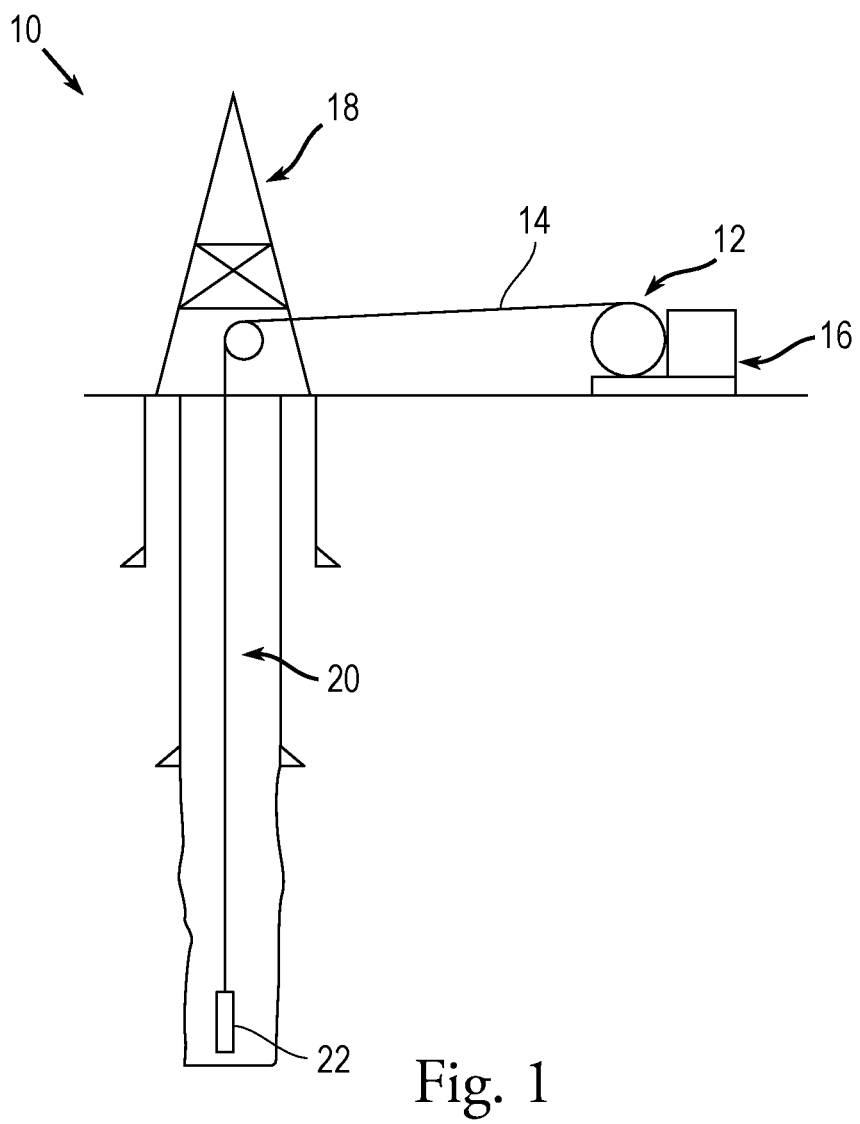
FIG. 1 is a schematic of deployment of sensors from a spool into a well, according to an embodiment.

As shown in FIG. 1, the system 10 includes a spool 12 of the flexible tape 14 having the sensor embedded therein. The flexible tape 14 advances from the spool 12 adjacent to a data acquisition unit 16. The data acquisition unit 16 is a hardware processor storing code therein configured to acquire sensor data from the sensor embedded in the flexible tape 14. The flexible tape 14 further advances into a well 18 along a conveyance line 20 that is shown extending into a borehole of the well 18. The conveyance line can be a wireline, slickline, fiber-line, drill-pipe, tubing, coiled-tubing, or other structures extending through a well, pipeline, or casing. The conveyance line 20 ends at a terminating member 22. The terminating member 22 can be a weight bar. Alternatively, the terminating member 22 can be a logging tool. Still further, the terminating member 22 can be a memory sub. In any of these arrangements, the terminating member has a weight to assist the tape in advancing down into the borehole.

Figure 2:
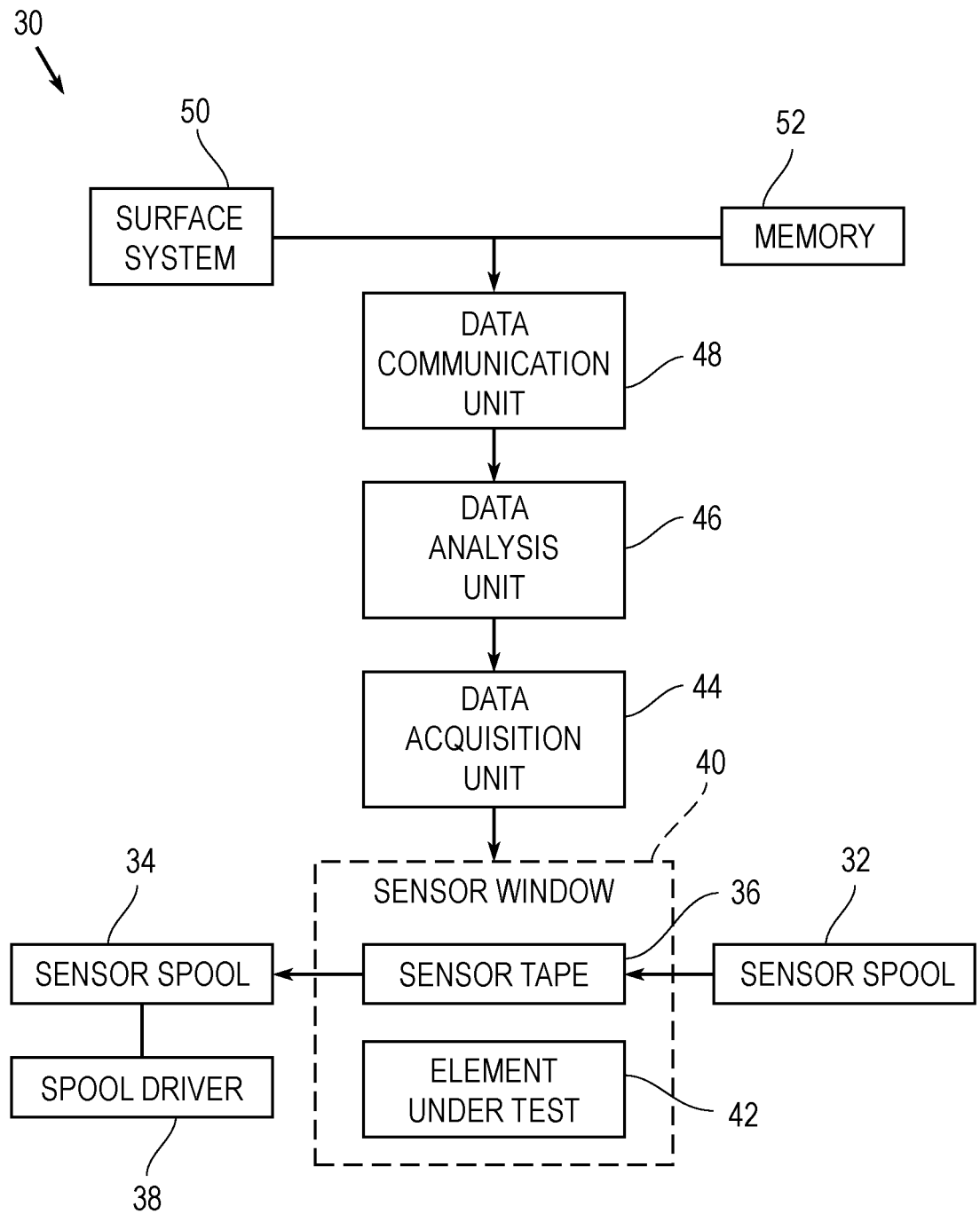
FIG. 2 is a schematic of an alternative deployment of sensors from a spool.

In an alternative embodiment illustrated in FIG. 2, the system 30 includes sensor spools 32, 34, with a sensor tape 36 advancing from the sensor spool 32 to the sensor spool 34 through the use of at least one spool driver 38 (only one illustrated), but a driver can be provided for each sensor spool. The sensor tape 36 is a flexible tape having a sensor embedded therein. The sensor tape 36 with the sensor is advanced to a sensor window 40 to be positioned adjacent to an element under test 42. The sensor on the sensor tape 36 generates sensor data corresponding to the state of the element under test, such as corrosion. The corrosion can be detected by the presence of hydrogen (H). Also, the corrosion can be detected by the presence of carbon dioxide ($CO_2$). In addition, the corrosion can be detected by the presence of hydrogen sulfide ($H_2S$). Furthermore, the corrosion can be detected by the presence of chlorine (Cl). Still further, the corrosion can be detected by the presence of iron (Fe).

Common to both arrangements of FIGS. 1 and 2, such sensor data is sent to a data acquisition unit 44. The data acquisition unit 44 is a hardware processor storing code therein configured to acquire the sensor data from the sensor embedded in the flexible sensor tape 36. The data acquisition unit 44 transmits the sensor data to a data analysis unit 46. The data analysis unit 46 is a hardware processor storing code therein configured to generate an alert from the sensor data. The data analysis unit 46 formats the alert to be in a predetermined communication format. The data analysis unit 46 transmits the formatted alert to a data communication unit 48. The data communication unit 48 is a hardware processor storing code therein and configured to output the alert to an external system. The external system is an output device configured to output the alert or the sensor data. The external system can be a surface system 50. The surface system 50 can further process the alert or the sensor data. Alternatively, the external system can be a memory 52 configured to store the alert or the sensor data to be available for later processing and analysis.

Figure 3:
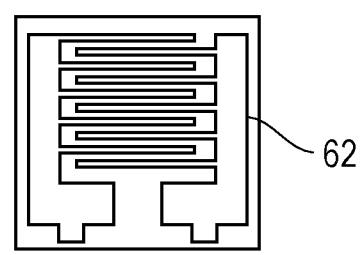
FIG. 3 is an example of a sensor.

Referring to FIG. 3, the sensor 62 comprises a chemical sensor. In certain embodiments, the chemical sensor can be made of synthetic zinc oxide (ZnO) nanostructures that are grown on a zeolite substrate to detect corrosion species. Alternatively, the sensor 62 can be an organic sensor. The organic sensor can be disposed on organic semiconductors or conductive organic materials. Furthermore, the sensor 62 can be a polyethylene terephthalate (PET) sensor. The PET sensor can detect gases.

Figure 4:
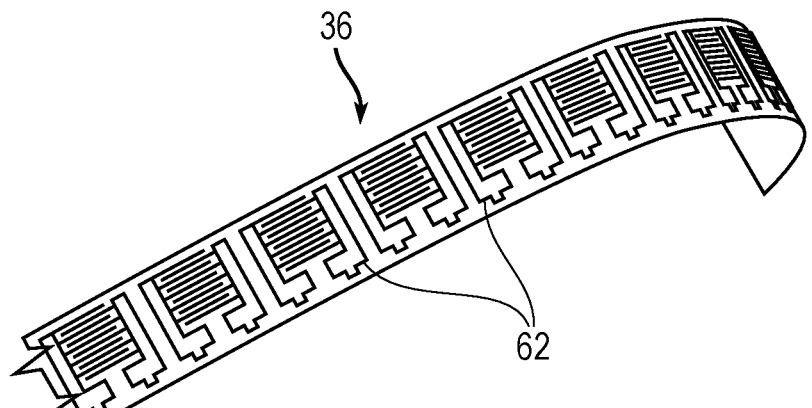
FIG. 4 is a tape having embedded sensors as in FIG. 3.
Figure 5:
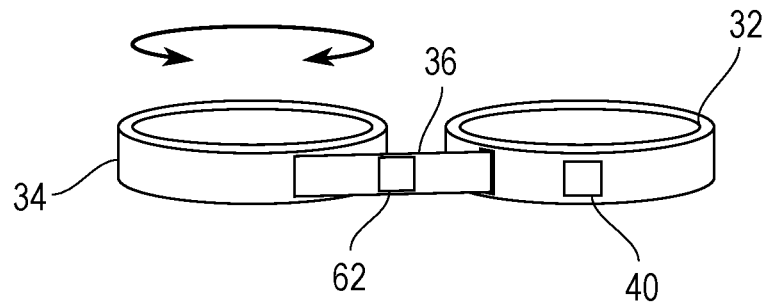
FIG. 5 shows spooling of a tape having embedded sensors in a first orientation.
Figure 6:
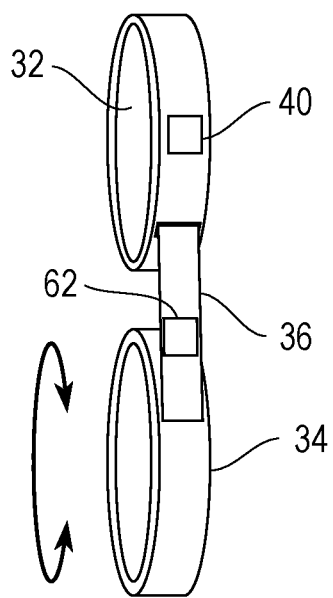
FIG. 6 shows spooling of a tape having embedded sensors in a second orientation.
Figures 7, 8:
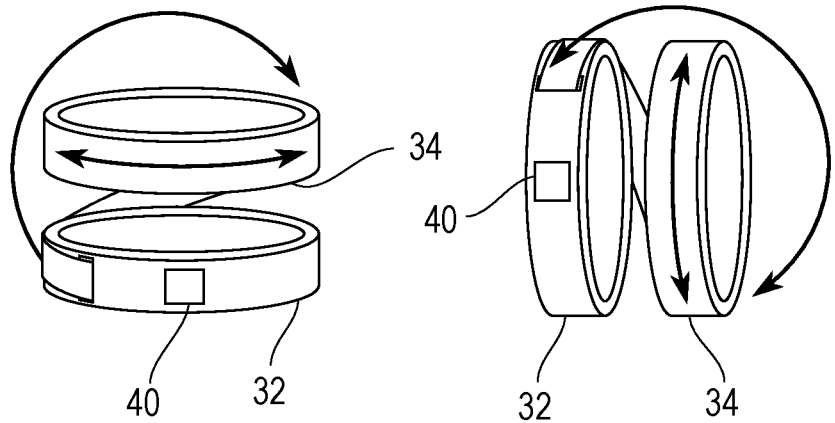
FIG. 7 shows spooling of a tape having embedded sensors in a third orientation.
FIG. 8 shows spooling of a tape having embedded sensors in a fourth orientation.

As shown in FIG. 4, the sensor tape 36 is a flexible tape having at least one sensor 62 of one or multiple types embedded therein. Referring to FIGS. 5-8, the sensor tape 36 can be spooled on the spools 32, 34 to advance the tape 36 to position the at least one sensor 62 adjacent to the sensor window 40. As shown in the schematic views provided in FIGS. 5-8, the tape advances from the spool 32 in a direction relative to the structure such as the element under test 42. As illustrated in FIG. 5, the direction is a horizontal direction. Alternatively, the direction is an inline-longitudinal direction. As illustrated in FIG. 6, the direction is a vertical direction. Alternatively, the direction is an inline-azimuthal direction. As shown in FIGS. 7-8, direction is a diagonal direction. As illustrated in FIG. 7, the direction is a parallel-longitudinal direction. As illustrated in FIG. 8, the direction is a parallel-azimuthal direction.

Figure 9:
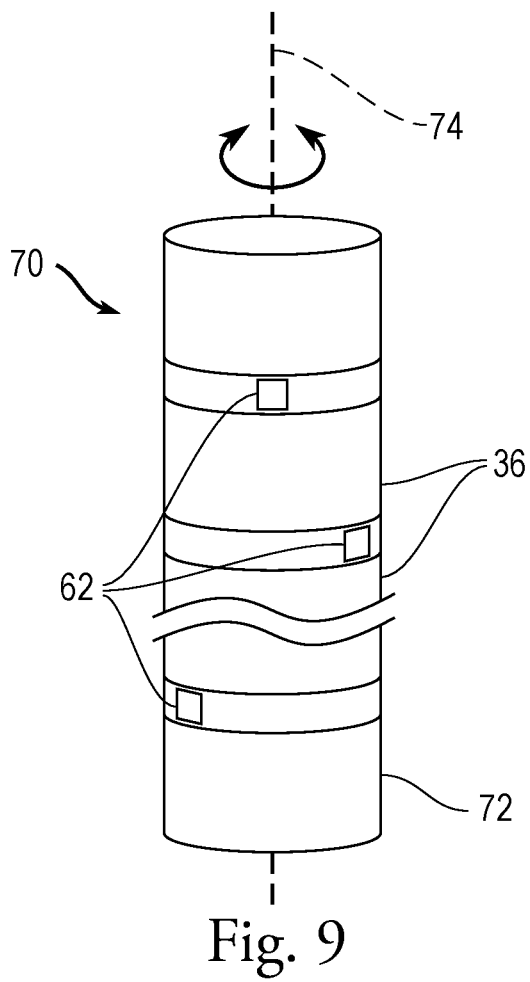
FIG. 9 is a logging tool with a tape having embedded sensors distributed thereon.
Figure 10:
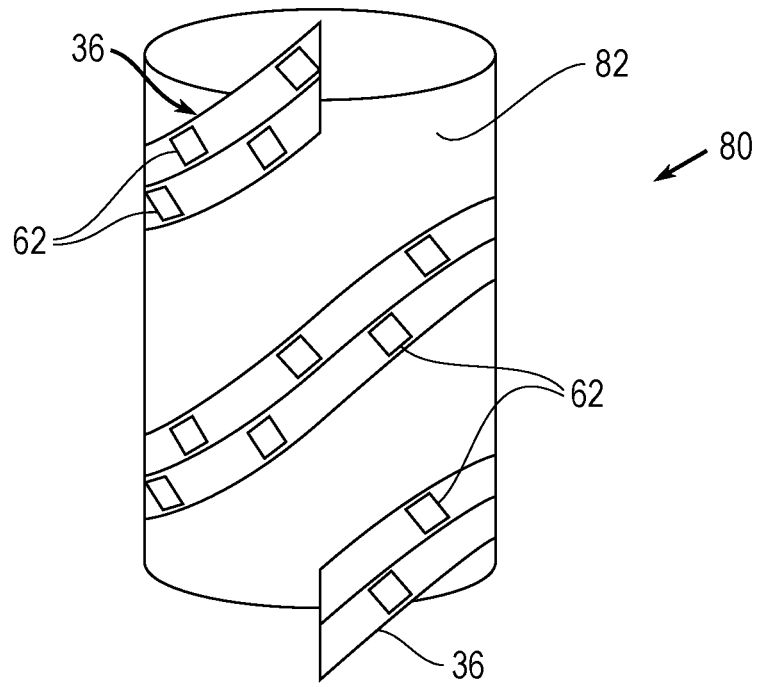
FIG. 10 is a logging tool wrapped with a tape having embedded sensors.
Figure 11:
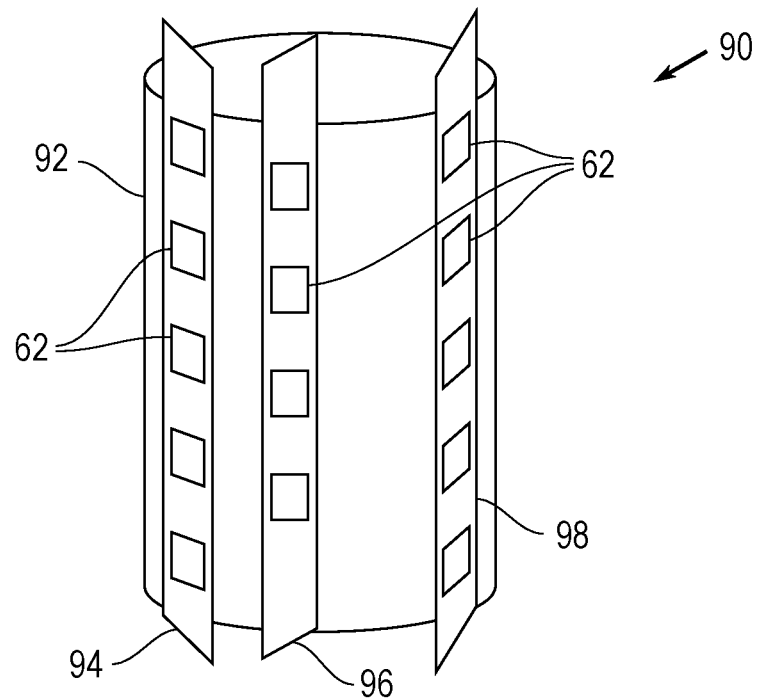
FIG. 11 is a logging tool with adjacent tapes having embedded sensors.

Referring to FIG. 9, a logging tool 70 has a structure 72 as the element under test. The structure 72 can optionally rotate about an axis 74. As the structure rotates, various sensors 62 on respective tapes 36 are positioned horizontally adjacent to the surface of the structure 72 to detect corrosion at specific locations on the structure 72. In alternative embodiments, as shown in FIGS. 10-11 the tapes 36 having sensors 62 embedded therein can be spooled about the surface of the structures to detect corrosion. Referring to FIG. 10, a logging tool 80 can have a structure 82 with tape 36 spooled helically adjacent to the structure 82. Referring to FIG. 11, a logging tool 90 can have a structure 92 with different tapes 94, 96, 98 spooled vertically adjacent to the structure 92. As with the logging tool 70 in FIG. 9, the logging tools 80, 90 in FIGS. 10-11, respectively, can rotate. Such rotation allows the sensors 62 to be positioned adjacent to different regions on the structures 82, 92, to detect for corrosion at different locations on the logging tools 80, 90, respectively.

Figure 12:
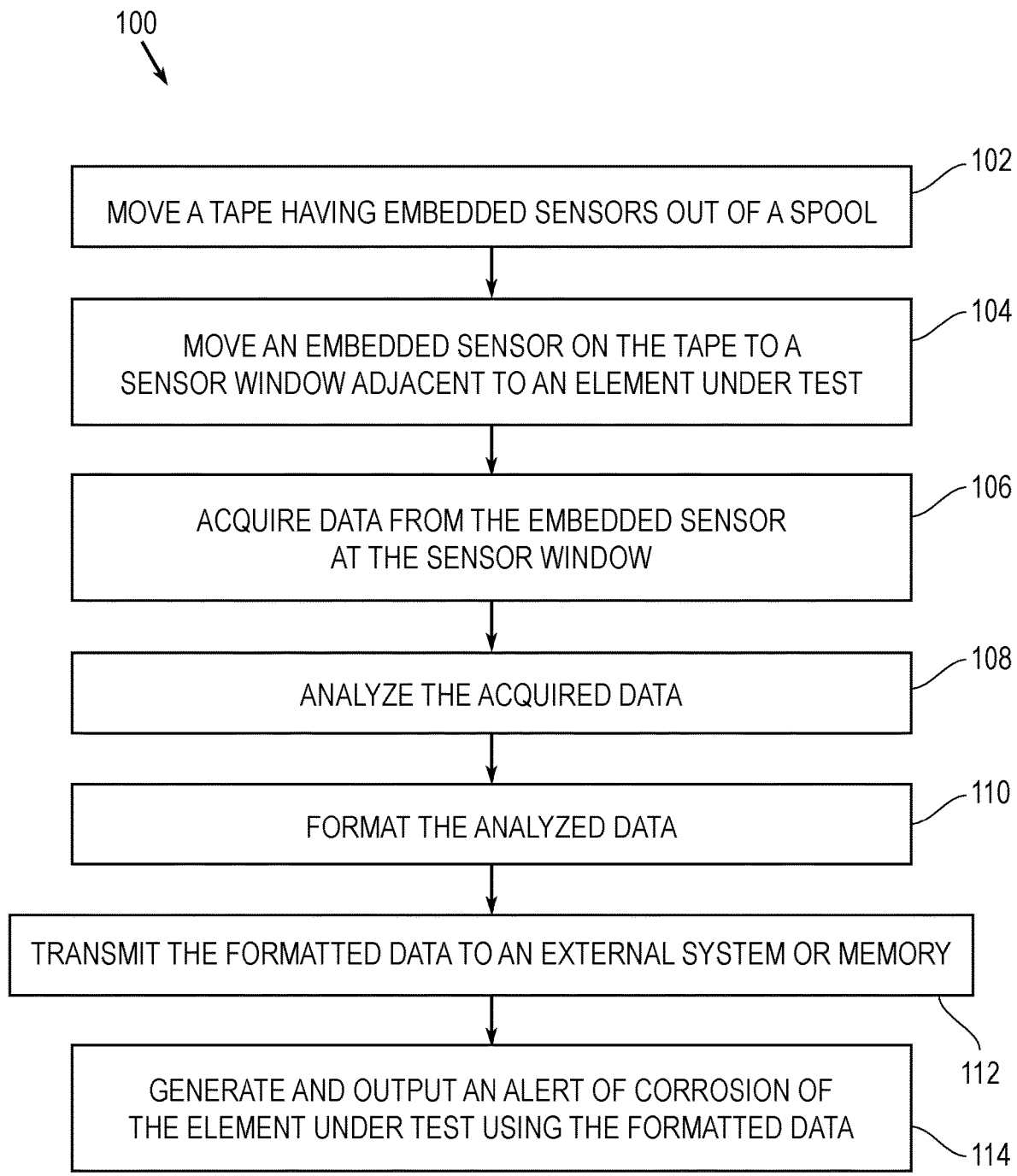
FIG. 12 is a flowchart of a method of use of a tape having embedded sensors.

As shown in FIG. 12, the method 100 of operation of the systems 10, 30 include moving or advancing a tape 36 having embedded sensors 62 out of or from a spool 32 in step 102, and moving or positioning the embedded sensor 62 on the tape 36 to a sensor window 40 adjacent to an element 42 under test in step 104. Then data is acquired from the embedded sensor 62 at the sensor window 40 in step 106, and the acquired data is analyzed in step 108. The analyzed data is formatted in step 110 in a conventional manner to meet the requirements of an external system. For instance, the data can be formatted into a spreadsheet and saved so as to be compatible with Microsoft Excel, or saved as a comma-separated values table, text file, and so on. Alternatively, the data can be saved in data value pairs and saved in a list. The formatted data is transmitted to an external system 50 or memory 52 in step 112. The method 100 then generates and outputs an alert of corrosion of the element 42 under test using the formatted data in step 114.

In an alternative arrangement, the system and method described herein can have a sensor as previously described embedded in the conveyance line within a well or, alternatively, in a surface structure. In these arrangements, the sensor still monitors for corrosion of a structure, but is mounted in a different position.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system, comprising:
   a structure including a window adjacent to an element under test;
   a spool;
   a flexible tape retained by the spool;
   a sensor embedded in the tape, the sensor being configured to detect a corrosion of the element and to generate corresponding sensor data;
   a spool driver coupled to the spool and operative to advance the tape from the spool to position the sensor adjacent to the window, thereby to position the sensor adjacent to the element to detect the corrosion; and
   a processor configured by code stored therein to receive the sensor data and to generate and output an alert of the detected corrosion.

2. The system of claim 1, wherein the sensor is selected from the group consisting of: a chemical sensor, an organic sensor, and a polyethylene terephthalate (PET) sensor.

3. The system of claim 1, wherein the tape advances from the spool in a direction relative to the structure, with the direction being selected from the group consisting of: a horizontal direction, a vertical direction, a diagonal direction, an inline-longitudinal direction, an inline-azimuthal direction, a parallel-longitudinal direction, and a parallel-azimuthal direction.

4. The system of claim 1, wherein the processor includes:
   a data acquisition unit configured to receive the sensor data;
   a data analysis unit configured to generate the alert from the sensor data; and
   a data communication unit configured to output the alert to an external system.

5. The system of claim 4, wherein the data analysis unit formats the alert to be in a predetermined communication format.

6. The system of claim 4, wherein the data analysis unit formats the sensor data to be in a predetermined communication format; and
wherein the data communication unit is configured to output the formatted sensor data to the external system.

7. The system of claim 4, wherein the external system is an output device configured to output the alert or the sensor data.

8. A system, comprising:
a conveyance line in a well;
a spool;
a flexible tape retained by the spool;
a plurality of sensors embedded in and distributed along the tape, wherein the plurality of sensors are configured to detect a corrosion of the conveyance line and to generate corresponding sensor data;
a spool driver coupled to the spool and operative to advance the tape from the spool to position the plurality of sensors adjacent to the conveyance line; and
a processor configured by code stored therein to receive the sensor data and to generate and output an alert of the detected corrosion.

9. The system of claim 8, wherein each of the plurality of sensors is selected from the group consisting of: a chemical sensor, an organic sensor, and a polyethylene terephthalate (PET) sensor.

10. The system of claim 8, wherein the tape advances from the spool in a direction relative to the conveyance line, with the direction being selected from the group consisting of: a horizontal direction, a vertical direction, a diagonal direction, an inline-longitudinal direction, an inline-azimuthal direction, a parallel-longitudinal direction, and a parallel-azimuthal direction.

11. The system of claim 8, wherein the processor includes:
a data acquisition unit configured to receive the sensor data;
a data analysis unit configured to generate the alert from the sensor data; and
a data communication unit configured to output the alert to an external system.

12. The system of claim 8, wherein the data analysis unit formats the alert to be in a predetermined communication format.

13. The system of claim 8, wherein the data analysis unit formats the sensor data to be in a predetermined communication format; and
wherein the data communication unit is configured to output the formatted sensor data to the external system.

14. The system of claim 8, wherein the external system is an output device configured to output the alert or the sensor data.

15. A method, comprising:
providing a structure including a window adjacent to an element under test;
retaining a flexible tape with a spool, wherein the tape comprises an embedded sensor;
advancing the tape from the spool to position the sensor adjacent to the window, thereby to position the sensor adjacent to the element to detect the corrosion and to generate corresponding sensor data;
receiving the sensor data at a processor;
generating an alert of the detected corrosion; and
outputting the alert to an external system.

16. The method of claim 15, wherein the sensor is selected from the group consisting of: a chemical sensor, an organic sensor, and a polyethylene terephthalate (PET) sensor.

17. The method of claim 15, wherein the tape advances from the spool in a direction relative to the structure, with the direction being selected from the group consisting of: a horizontal direction, a vertical direction, a diagonal direction, an inline-longitudinal direction, an inline-azimuthal direction, a parallel-longitudinal direction, and a parallel-azimuthal direction.

18. The method of claim 15, further comprising:
outputting the sensor data to the external system or to a memory.

19. The method of claim 15, wherein the processor includes:
a data acquisition unit configured to receive the sensor data;
a data analysis unit configured to generate the alert from the sensor data; and
a data communication unit configured to output the alert to the external system.

20. The method of claim 15, wherein the external system is an output device configured to output the alert or the sensor data.

* * * * *